(12) United States Patent
Blümel

(10) Patent No.: US 7,101,059 B2
(45) Date of Patent: Sep. 5, 2006

(54) LED SIGNALING DEVICE FOR ROAD TRAFFIC SIGNALS

(75) Inventor: Simon Blümel, Schierling (DE)

(73) Assignee: Osram GmbH, Regensburg (DE)

( * ) Notice: Subject to any disclaimer, the term of this patent is extended or adjusted under 35 U.S.C. 154(b) by 53 days.

(21) Appl. No.: 10/601,532

(22) Filed: Jun. 23, 2003

(65) Prior Publication Data

US 2004/0056777 A1 Mar. 25, 2004

Related U.S. Application Data

(63) Continuation of application No. PCT/DE00/04591, filed on Dec. 22, 2000.

(51) Int. Cl.
*F21V 5/00* (2006.01)

(52) U.S. Cl. .................. 362/244; 362/545; 362/294

(58) Field of Classification Search ............. 362/545, 362/547, 235, 240, 244, 294; 116/63
See application file for complete search history.

(56) References Cited

U.S. PATENT DOCUMENTS

| | | | | |
|---|---|---|---|---|
| 4,729,076 A | * | 3/1988 | Masami et al. | 362/235 |
| 5,947,587 A | * | 9/1999 | Keuper et al. | 362/235 |
| 6,283,613 B1 | * | 9/2001 | Schaffer | 362/245 |
| 6,707,435 B1 | * | 3/2004 | Merlato et al. | 345/39 |
| 2002/0105801 A1 | * | 8/2002 | Martineau | 362/244 |
| 2003/0189829 A1 | * | 10/2003 | Shimizu et al. | 362/240 |

FOREIGN PATENT DOCUMENTS

| EP | 0 860 805 A1 | 8/1998 |
|---|---|---|
| EP | 0 905 439 A2 | 3/1999 |

OTHER PUBLICATIONS

Möllmer, F. et al.: "Siemens SMT-TOPLED für die Oberflächenmontage" [Siemens SMT-TOPLED for Surface Mounting], Siemens Components 29, Issue 4, 1991, pp. 147-149.

* cited by examiner

*Primary Examiner*—Ali Alavi
(74) *Attorney, Agent, or Firm*—Laurence A. Greenberg; Werner H. Stemer; Ralph E. Locher

(57) ABSTRACT

The invention describes an optical signal transmitter device, in which a specific, predetermined emission characteristic or light density distribution is achieved solely by the arrangement of two or more light elements on a base plate. This means that there is no longer any need for complicated optical structures in order to produce the predetermined light distribution. The invention furthermore describes an optical signal transmitter device that uses a convex condenser in order to improve the light gathering characteristic.

29 Claims, 4 Drawing Sheets

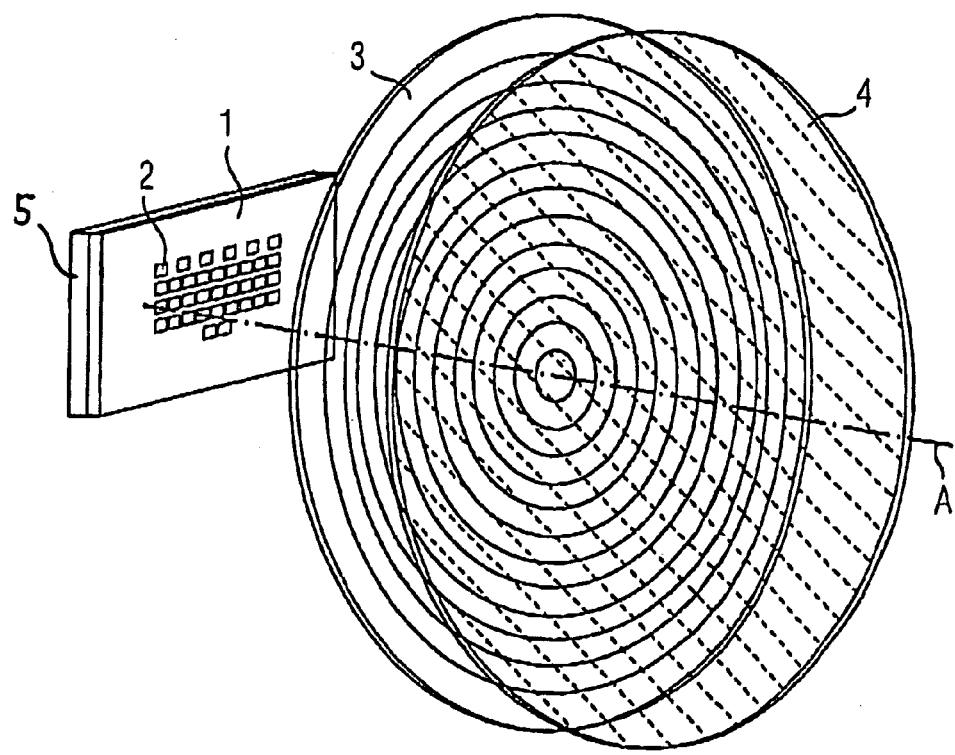
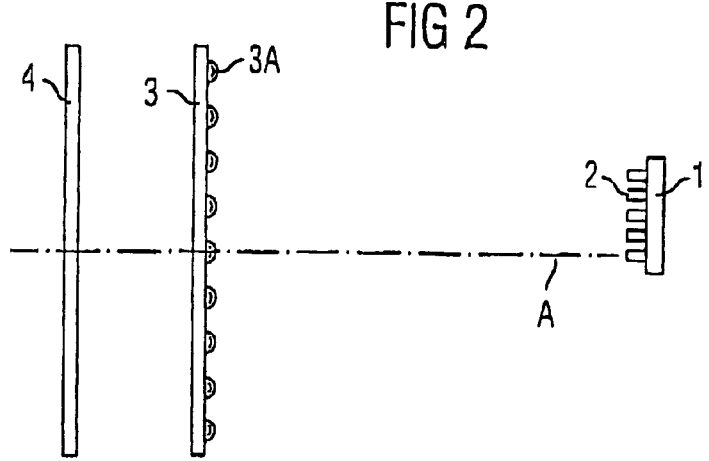

LED SIGNALING DEVICE FOR ROAD TRAFFIC SIGNALS

CROSS-REFERENCE TO RELATED APPLICATION

This application is a continuation of copending International Application No. PCT/DE00/04591, filed Dec. 22, 2000, which designated the United States and was not published in English.

BACKGROUND OF THE INVENTION

Field of the Invention

The invention relates to an optical signal transmitter device, in particular for traffic signaling systems.

In conventional signaling technology for road or rail traffic, a powerful light source with small dimensions, such as the filament of an incandescent lamp, is normally placed at the focal point of an optical condenser, and is projected to infinity. The high light density of the light source results in a very high light intensity within a relatively small and standardized emission angle range, so that the signal can still be identified well, even from a long distance.

However, incandescent lamps are known to have a limited life, and the failure of the incandescent lamp that is used for a signaling device is always associated with a total failure of the entire signaling device. The incandescent lamps that are used, for example, for warning signal devices must therefore be replaced as a precautionary measure at regular time intervals. These time intervals are far shorter than the average life of the lamp, so that their replacements are associated with considerable use of material and take a considerable amount of time.

Similar problems also arise with other control signaling devices, because of the use of conventional incandescent lamps as light sources.

Because of the high failure rate of convention incandescent lamps, it is thus advantageous to use semiconductor light emitting diodes (LEDs) as light sources, since LEDs not only have a considerably longer life, but also more efficiently convert electrical energy into radiated energy in the visible spectral band. Associated with this increased efficiency is a reduced heat emission and a smaller space requirement overall. However, in order to provide an LED arrangement which is suitable for a traffic signaling device or a comparable signaling device, it is likewise necessary in the same way as for the conventional traffic signaling or railroad signaling device to use optics which are suitable for focusing the light that is emitted from the individual LEDs such that, even at a relatively long distance, it is perceived as a light source with a physical extent and as a bright light. Signaling transmitters for road traffic are subject to detailed and standardized optical requirements with regard to the emission characteristic, light density distribution, and phantom light. The term phantom light refers to the simulation of a switched-on signaling light by incident sunlight that is reflected from an internal reflector.

Known structures for road traffic signals with an LED light source may be rotationally symmetrical, as a result of which a specific proportion of the emitted light disappears. Furthermore, this can result in problems with phantom light. Other known structures have complicated optics, which make it more difficult to produce a signal transmitter insert at low cost.

Published European Patent Application EP 0 860 805 describes signal transmitter optics in which a large number of light elements are arranged in the interior of a signal chamber, and thus form an essentially flat light body instead of the previously normal incandescent lamps. These light elements emit light that is directed in the direction of a scattering lens, even without using a reflector. The light source is composed of at least three individual light elements, which emit at least the majority of their light to the lens system, where it is gathered and focused by a common condenser, and is distributed by the scattering lens in accordance with chosen requirements. However, this arrangement has the disadvantage that a scattering lens with optical characteristics must be used in order to define an emission characteristic. The production of such a scattering disk with optical characteristics and its installation in the two-stage optical structure are, however, relatively complicated and, in consequence, costly.

SUMMARY OF THE INVENTION

It is accordingly an object of the invention to provide an optical signaling device which overcomes the above-mentioned disadvantages of the prior art apparatus of this general type.

In particular, an object of the present invention is to specify an optical signaling device, in particular for road traffic signals, which supplies a required emission characteristic or light density distribution using methods which are as simple and uncomplicated as possible.

In particular, another object of the present invention is to specify an optical signaling device that can achieve a required emission characteristic or light density distribution even without using a scattering disk with optical characteristics.

A further object of the present invention is to develop a signaling device of this generic type such that the light that is emitted by the LEDs can be gathered more efficiently by the optical arrangement.

The present invention accordingly describes an optical signal transmitter device having two or more light elements which are arranged on a base plate, and having a condenser which is arranged at a fixed distance from the light elements on an optical axis, in order to project the light which is emitted from the light elements to infinity.

On the basis of this arrangement, each light element has an associated emission direction, so that the light density in a specific emission direction is largely decoupled from the light density distribution for other emission directions. This arrangement advantageously allows a specific predetermined emission characteristic or light density distribution to be achieved solely by the arrangement of the light elements on the base plate.

The invention has the major advantage that a specific, required emission characteristic or light density distribution can be achieved in an optical signal transmitter device by using a considerably simplified optical configuration. Specifically, there is no need for the scattering disk, as is absolutely essential in the prior art, for producing the light distribution.

A standard Fresnel lens may be used as the condenser. The Fresnel lens projects the light source to infinity. However, in order to ensure that the bridge system of the arrangement of the light elements is not imaged at infinity, the condenser can be arranged at a distance from the plane of the light elements such that the light elements are located slightly away from the focal plane of the condenser. As an alternative to this, the focusing condition can also be satisfied exactly using optical structures for deliberate defocusing, in particular by arranging spherical lenses on the condenser, in particular, on its surface facing the light elements.

In a further embodiment, the invention describes an optical signal transmitter device having two or more light elements that are arranged on a base plate, and having a condenser which is arranged at a fixed distance from the light elements on an optical axis, in order to project the light which is emitted from the light elements to infinity. A specific predetermined emission characteristic or light density distribution is achieved by the arrangement of the light elements on the base plate and/or by the optical characteristics of a scattering lens that may be provided, in accordance with chosen requirements, and with the condenser being convex.

An optical signal transmitter device such as this has a considerably more efficient light gathering characteristic. In this case as well, the condenser is preferably formed from a Fresnel lens. Since Fresnel lenses can be produced particularly advantageously from plastic using the injection molding process for applications such as these, curved Fresnel lenses can also be produced with relatively few problems.

These LEDs, in particular SMT-compatible LEDs, are preferably used as the light elements. In this case, an LED structure is preferably used as described in the article "SIEMENS SMT-TOP-LEDs for surface mounting" by F. Möllmer and G. Waitl in the journal "SIEMENS Components" 29 (1991), issue 4, page 147, and as illustrated in FIGS. 1A, B there. On this basis, the base plate according to the present invention is preferably a panel, in particular a panel with a metal core, which may additionally be fitted to a suitable heat sink in order to improve the heat dissipation further.

Alternatively, LED semiconductor bodies can also be used as light elements that are fitted directly to the base plate. This means that the LED semiconductor bodies are mounted as such on the base plate and are not, as is otherwise normal, installed in housings that are mounted on the base plate. A chip-on-board technology is preferably used for directly mounting the LED semiconductor bodies. For mounting purposes, the LED semiconductor bodies can be soldered to the base plate, or can be adhesively bonded to it using an electrically conductive adhesive.

In one embodiment that is preferably used for road traffic lights, the optical signal transmitter device does not transmit any light in the obliquely upward direction, so that sunlight, which is likewise but conversely also incident obliquely upward, cannot strike the light elements, so that they cannot produce any phantom light. In order in addition to avoid the occurrence of phantom light reflections in all other feasible embodiments, the base plate can also be colored black away from the light elements.

In one advantageous development of the invention, the light elements are connected electrically in parallel or in series. Parallel connection in this case has the advantage that the signal transmitter device remains operable even in the event of failure of individual light elements.

Once connected in series, the signal transmitter circuit can be supplied with higher operating voltages, with a reduced operating current. The voltages and currents that are required for this purpose can advantageously be provided more easily from the conventional supply networks.

In order to combine both advantages, it is particularly preferable for the light elements to be grouped in two or more parallel circuits, which are in turn connected in series.

Alternatively, the light elements can be combined to form two or more series circuits, with are in turn connected in parallel.

Other features which are considered as characteristic for the invention are set forth in the appended claims.

Although the invention is illustrated and described herein as embodied in an led signaling device for road traffic signals, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a schematic illustration of one exemplary embodiment of an optical signal transmitter device;

FIG. 2 is a section illustration of a further exemplary embodiment of an optical signal transmitter device;

DESCRIPTION OF THE PREFERRED EMBODIMENTS

Figure 3:
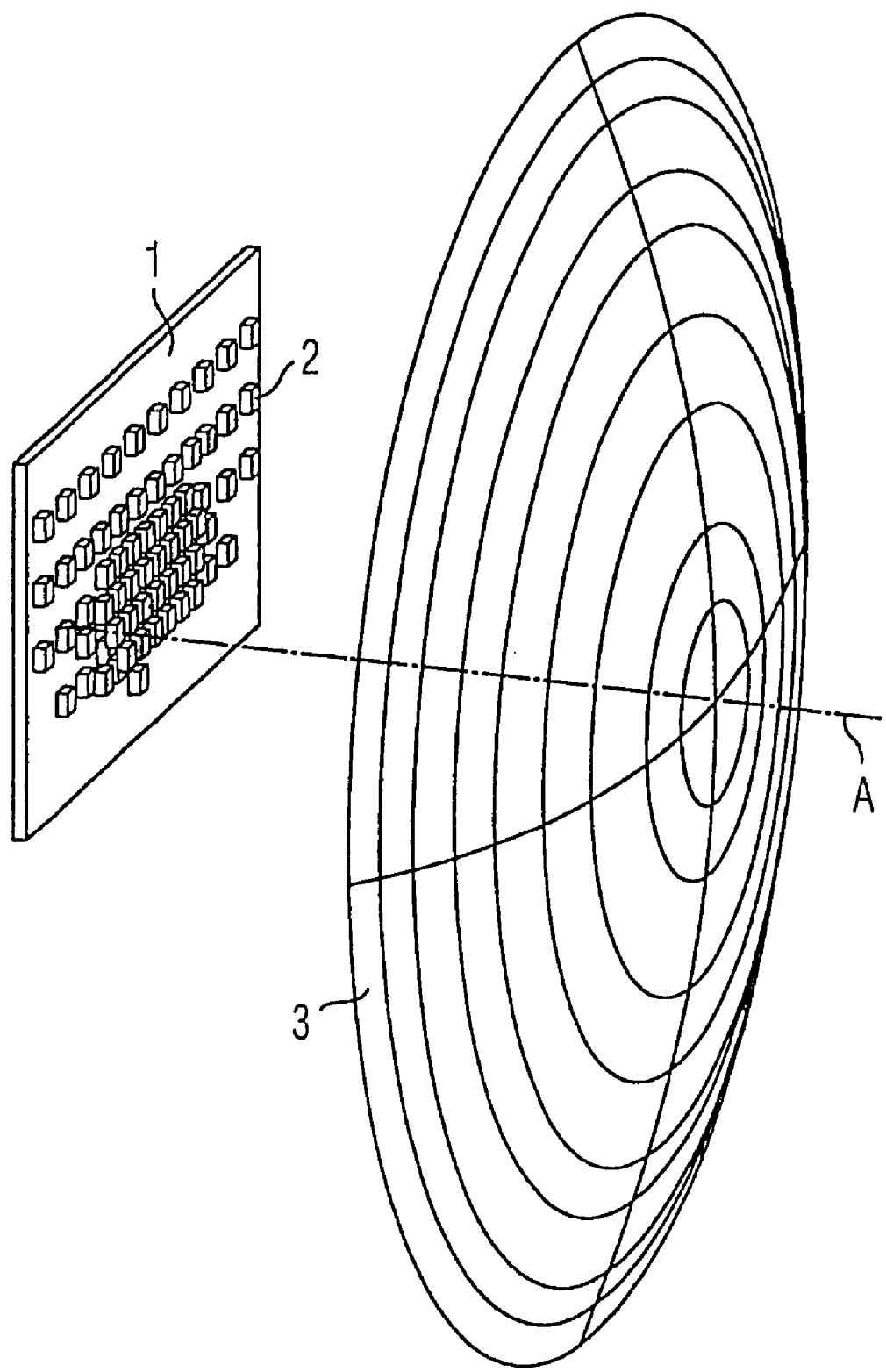
FIG. 3 is a perspective illustration of a further exemplary embodiment of an optical signal transmitter device.

Referring now to the figures of the drawing in detail and first, particularly, to FIG. 1 thereof, there is shown a perspective illustration of a first exemplary embodiment of an inventive optical signal transmitter device. Two or more light elements 2 such as light emitting diodes (LEDs) are arranged distributed in a predetermined manner on a base plate 1, which is preferably a panel such as a panel with a metal core or the like. This distribution determines the emission characteristic or light density distribution of the optical signal transmitter device. The base plate 1 can be fitted to an additional metallic heat sink 5, in order to additionally upgrade the heat dissipation from the LEDs, so that they can be operated with higher currents, thus making it possible to increase the light yield. The base plate 1 can be held in plug-in apparatus with an opening in the form of a slot, which plug-in apparatus is at the same time used as the voltage supply for the LEDs.

A condenser 3, preferably a Fresnel lens, is arranged at a predetermined distance from the base plate 1 on an optical axis A, such that the optical axis A passes through its center point. A standard Fresnel lens can be used as the Fresnel lens, which is normally produced from plastic using the injection molding process, and which is in the form of a circular disk with a standard diameter of 200 mm. The object of the condenser 3 is to project the light that is emitted from the LEDs to infinity. A shutter disk 4 can also be used behind the condenser 3 in the emission direction. The scattering disk that is used at conventional road traffic signals can be used as the shutter disk 4, even though it no longer has any significant influence on the initial characteristic.

It is advantageous for only the light density distribution of the LEDs to be projected to infinity, but not the point matrix of the LEDs. That is to say to incorrectly carry out the optical imaging. One way to achieve this is to incorrectly arrange the base plate 1 on the focal plane of the condenser 3.

Another variant is illustrated in FIG. 2. In this arrangement, the base plate 1 and the LEDs 2 are seated exactly on the focal plane of the condenser 3 which, however, additionally has small optical structures 3A on its surface facing the LEDs 2, which lead to deliberate defocusing. The optical structures 3A are preferably formed by small spherical lenses, which are not associated with the individual LEDs, and have a focal length that is short in comparison with the distance between the base plate 1 and the condenser 3. In particular, it has been found that, with a standard traffic signaling system, spherical lenses with a focal length of ⅙ of the distance between the base plate and the condenser can advantageously be used, by virtue of the dimensions that are provided by them.

The arrangements that are illustrated in FIGS. 1 and 2, which do not have any complicated optical structures, can be used to provide a light intensity and light density distribution in accordance with the standards. Since the emission area is restricted virtually exclusively to the spatial area underneath the optical axis A, there is no need to be concerned about the interference reflections from phantom light sources (solar radiation) which inject radiation into the signal transmitter device from above the optical axis A, since the radiation of a light source which injects radiation into the signal transmitter device from above is focused by the Fresnel optics at a point which is located outside the LED arrangement on the base plate 1. For additional suppression of phantom light reflections, the base plate 1 may also be colored black at various points at which no LEDs are located.

Figure 4:
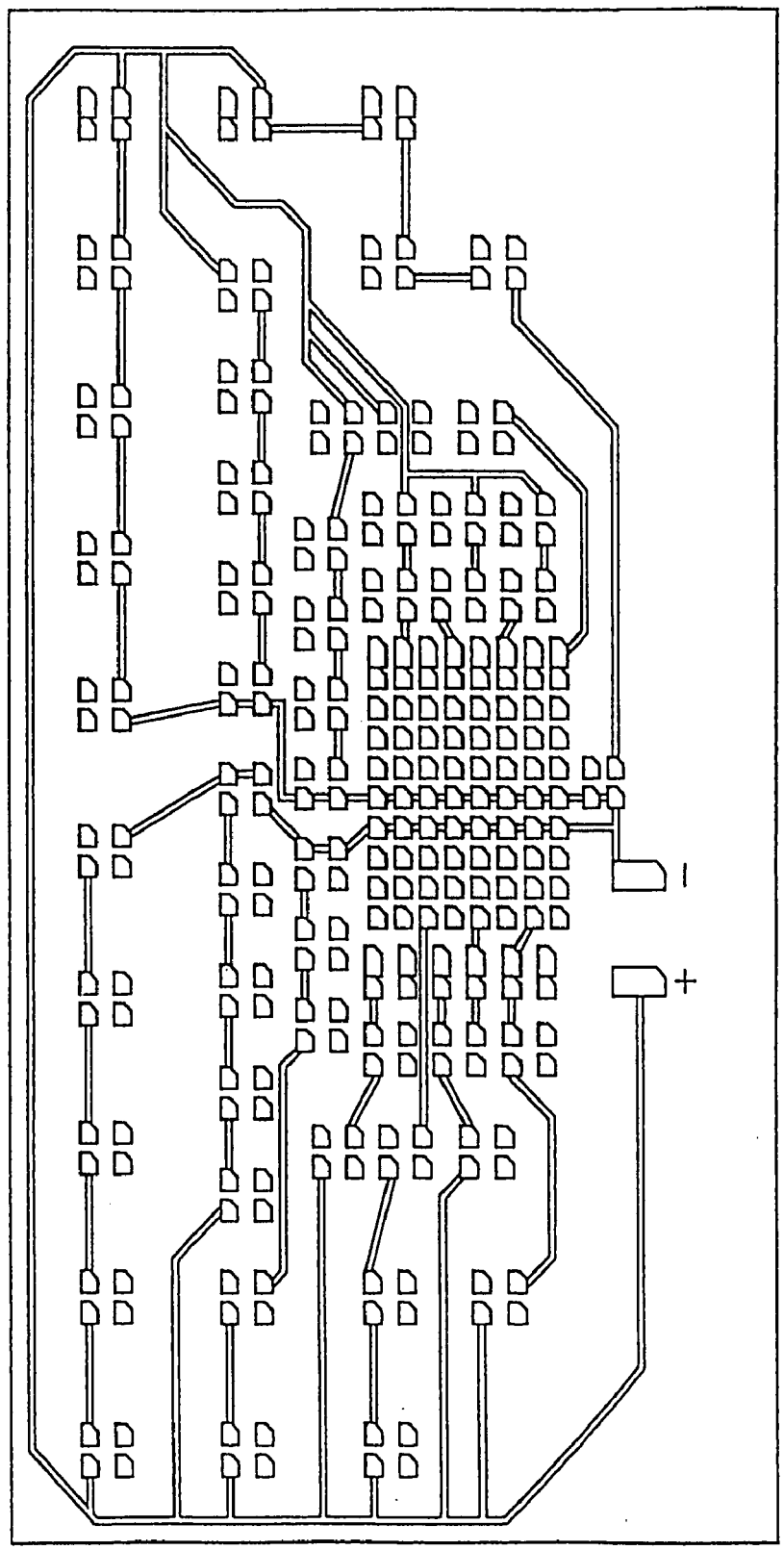
FIG. 4 is a plan view of a panel containing a conductor track structure for holding light elements.

FIG. 4 shows an exemplary embodiment of a metallization structure 100 on a panel for fitting SMT-compatible Power-TOPLEDs®. LEDs such as these normally have one anode connection and three cathode connections, so that four connecting pads are required for each LED. One LED is thus soldered on using an SMT process for each illustrated group of four connecting pads. The resultant distribution of the LEDs results in the signal transmitter device having an emission characteristic in accordance with the standards. The large-area connection pads +/− result in electrical contact being made with the entire electrical circuit in the plug connector. The use of such small standard LEDs allows the use of a large number of mutually independent individual LEDs, owing to their small physical size, thus ensuring the functionality of the signal, despite the possible failure of individual LEDs. The current passes through in a suitable manner. This aspect is particularly important for use in rail traffic areas (level crossings), since the signals are subject to particularly stringent standard operational safety requirements in this case.

The emission characteristic of the optical signal transmitter device according to the present invention can be adjusted more exactly via the arrangement of the light elements than via complicated optical structures. All that is necessary is to arrange the LEDs on the base plate 1, and to use standard Fresnel optics. The closing scattering disk which is normally always installed in traffic-light and signaling systems can still be used, since it no longer makes any significant contribution to the light distribution.

FIG. 3 illustrates a further aspect of the present invention, which may regarded as being independent of the way in which the emission characteristic or light density distribution is achieved. A signal transmitter device as shown in FIG. 3 has a base plate 1 and two or more light elements 2 arranged on it. A condenser 3, preferably a Fresnel lens, is arranged at a distance from it on an optical axis A, and its object is to project the light which is emitted from the light elements 2 to infinity. The base plate 1 together with the light elements 2 is arranged essentially on the focal plane of the Fresnel lens. In order to increase the light gathering characteristic of the Fresnel lens, this lens is convex. In other words, the Fresnel lens is shaped in such a way that lines which run from the center point to the edge describe an arc round the base plate 1, that is to say they are curved in the direction of the base plate 1.

Since a circular standard Fresnel disk is used as the Fresnel lens and is produced from a plastic using the injection molding process, a disk such as this can be produced relatively easily with any desired curvature. The use of a Fresnel lens such as this thus makes it possible to increase the light yield from an optical signal transmitter device constructed according to the invention.

The two aspects of the present invention can also be combined with one another. A convex condenser 3, as described in FIG. 3, can accordingly also be used with an embodiment of an optical signal transmitter device as illustrated in FIGS. 1, 2 and 4.

Figure 5A:
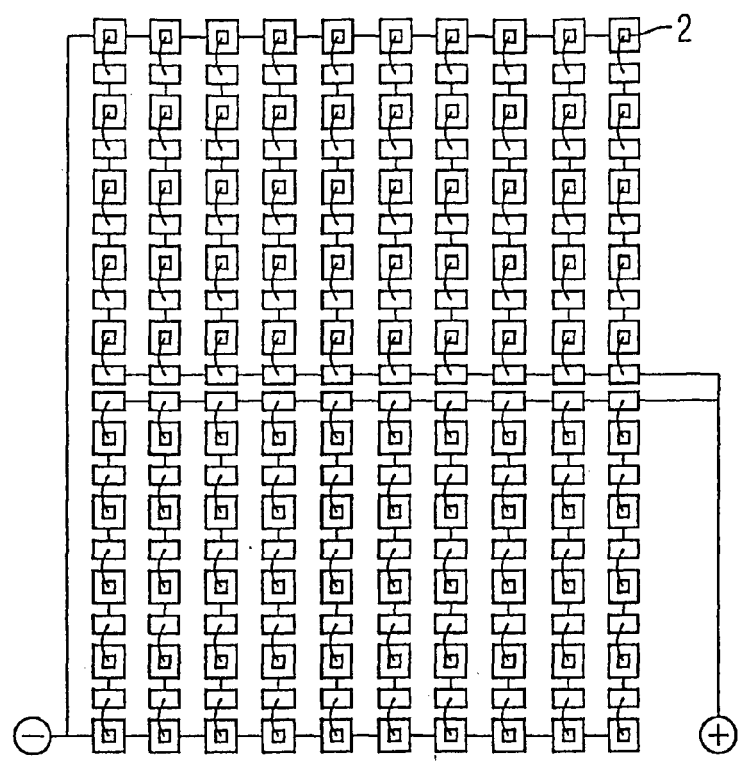
FIGS. 5A and 5B are circuit diagrams showing two electrical circuit variants of the light elements of an optical signal transmitter device.
Figure 5B:
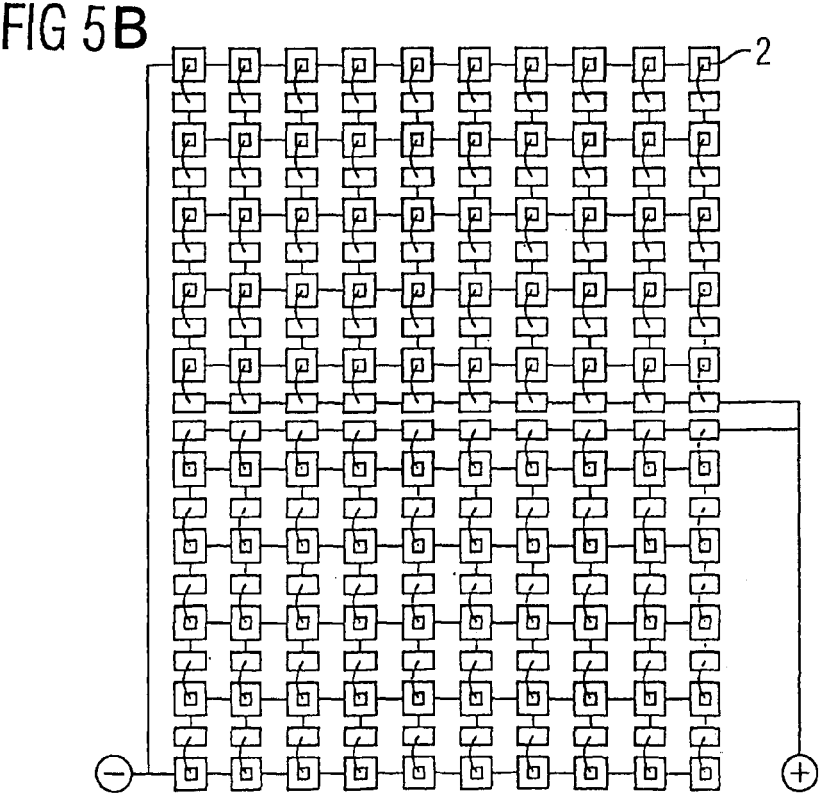

FIGS. 5A and 5B show two advantageous variants of a signal transmitter device constructed according to the invention. In FIG. 5A, 100 LEDs are combined in 20 series circuits, which each contain 5 LEDs. These 20 series circuits are operated connected in parallel.

In the circuit shown in FIG. 5B, 10 LEDs of 100 are in each case connected in parallel. Five of these parallel circuits are in each case combined to form two series circuits, which are in turn driven in parallel.

I claim:

1. An optical signal transmitter device, comprising:
   a base plate;
   at least two light elements located on said base plate in a configuration for solely defining a specific predetermined emission characteristic or a light density distribution, said light elements selected from the group consisting of SMT-compatible LEDs and LED semiconductor bodies fitted directly to said base plate; and
   a condenser configured on an optical axis at a fixed distance away from said light elements for projecting light emitted from said light elements to infinity.

2. The optical signal transmitter device according to claim 1, wherein:
   said condenser has a focal plane; and
   said light elements are located slightly away from said focal plane of said condenser.

3. The optical signal transmitter device according to claim 1, wherein:
   said condenser has a focal plane;
   said light elements are located on said focal plane of said condenser;
   said condenser has a configuration of optical structures for deliberate defocusing.

4. The optical signal transmitter device according to claim 3, wherein:
   said optical structures are spherical lenses that each have a convex surface;
   each of said optical structures are fitted on said surface of said condenser such that said convex surface faces said light elements; and
   said optical structures each have a focal length that is short in comparison with a distance between said base plate and said condenser.

5. The optical signal transmitter device according to claim 4, wherein said focal length is ⅙ of the distance between said base plate and said condenser.

6. The optical signal transmitter device according to claim 3, wherein:
said optical structures are spherical lenses that each have a convex surface;
each of said optical structures are fitted on said surface of said condenser such that said convex surface faces said light elements; and
said optical structures each have a focal length that is short in comparison with a distance between said base plate and said condenser.

7. The optical signal transmitter device according to claim 6, wherein said focal length is ⅙ of the distance between said base plate and said condenser.

8. The optical signal transmitter device according to claim 1, wherein said condenser has a surface facing said light elements and said optical structures are configured on said surface.

9. The optical signal transmitter device according to claim 1, wherein said condenser is a Fresnel lens.

10. The optical signal transmitter device according to claim 1, wherein said base plate is a panel.

11. The optical signal transmitter device according to claim 1, wherein said base plate is a panel with a metal core.

12. The optical signal transmitter device according to claim 1, further comprising a heat sink mounted to said base plate.

13. The optical signal transmitter device according to claim 1, wherein said base plate has regions located away from said light elements that are colored black.

14. The optical signal transmitter device according to claim 1, wherein said condenser is convex.

15. The optical signal transmitter device according to claim 1, wherein at least some of said light elements are electrically connected in series or in parallel.

16. The optical signal transmitter device according to claim 1, wherein:
said light elements are electrically combined to form at least two parallel circuits; and
at least some of said parallel circuits are connected in series.

17. The optical signal transmitter device according to claim 1, wherein:
said light elements are electrically combined to form at least two series circuits; and
at least some of said series circuits are connected in parallel.

18. An optical signal transmitter device, comprising:
a base plate;
at least two light elements configured on said base plate, said light elements selected from the group consisting of SMT-compatible LEDs and LED semiconductor bodies fitted directly to said base plate;
a condenser having a convex curvature configured on an optical axis at a fixed distance away from said light elements for projecting light emitted from said light elements to infinity; and
a scattering lens having optical characteristics;
at least one feature, selected from a group consisting of said configuration of said light elements and said optical characteristics of said scattering lens, enabling a specific predetermined emission characteristic or a light density distribution.

19. The optical signal transmitter device according to claim 18, wherein:
said condenser has a focal plane; and
said light elements are located slightly away from said focal plane of said condenser.

20. The optical signal transmitter device according to claim 18, wherein:
said condenser has a focal plane;
said light elements are located on said focal plane of said condenser;
said condenser has a configuration of optical structures for deliberate defocusing.

21. The optical signal transmitter device according to claim 18, wherein said condenser has a surface facing said light elements and said optical structures are configured on said surface.

22. The optical signal transmitter device according to claim 18, wherein said condenser is a Fresnel lens.

23. The optical signal transmitter device according to claim 18, wherein said base plate is a panel.

24. The optical signal transmitter device according to claim 18, wherein said base plate is a panel with a metal core.

25. The optical signal transmitter device according to claim 18, further comprising a heat sink mounted to said base plate.

26. The optical signal transmitter device according to claim 18, wherein said base plate has regions located away from said light elements that are colored black.

27. The optical signal transmitter device according to claim 18, wherein at least some of said light elements are electrically connected in series or in parallel.

28. The optical signal transmitter device according to claim 18, wherein:
said light elements are electrically combined to form at least two parallel circuits; and
at least some of said parallel circuits are connected in series.

29. The optical signal transmitter device according to claim 18, wherein:
said light elements are electrically combined to form at least two series circuits; and
at least some of said series circuits are connected in parallel.

* * * * *

UNITED STATES PATENT AND TRADEMARK OFFICE
CERTIFICATE OF CORRECTION

PATENT NO. : 7,101,059 B2  Page 1 of 1
APPLICATION NO. : 10/601532
DATED : September 5, 2006
INVENTOR(S) : Simon Blümel It is certified that error appears in the above-identified patent and that said Letters Patent is hereby corrected as shown below:

On the title page
The assignee's city was incorrect, and therefore, item (73) should read as follows:

(73) Assignee: Osram GmbH, München, Germany

Signed and Sealed this

Thirty-first Day of July, 2007

JON W. DUDAS
*Director of the United States Patent and Trademark Office*